(12) United States Patent
Tamura et al.

(10) Patent No.: US 7,716,412 B2
(45) Date of Patent: May 11, 2010

(54) DATA STORAGE APPARATUS AND DATA ACCESS METHOD FOR CONTROLLING ADDRESS INFORMATION FOR DATA WRITING USING A FREE AREA CONTROL TABLE

(75) Inventors: Tetsuya Tamura, Kanagawa (JP); Hajime Nishimura, Kanagawa (JP); Takeshi Sasa, Miyagi (JP); Kazuya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 11/687,969

(22) Filed: Mar. 19, 2007

(65) Prior Publication Data
US 2008/0046646 A1 Feb. 21, 2008

(30) Foreign Application Priority Data
Mar. 20, 2006 (JP) ............................ P2006-077278

(51) Int. Cl.
*G06F 13/00* (2006.01)
(52) U.S. Cl. ...................... 711/102; 711/112; 711/170; 711/221
(58) Field of Classification Search ................ 711/112, 711/170, 102, 221
See application file for complete search history.

(56) References Cited

U.S. PATENT DOCUMENTS 6,378,031 B1 * 4/2002 Kuno et al. .................... 711/4

FOREIGN PATENT DOCUMENTS

JP 2006-48227 2/2006

* cited by examiner

*Primary Examiner*—Mardochee Chery
(74) *Attorney, Agent, or Firm*—K&L Gates LLP (57) ABSTRACT

A data storage apparatus is provided. The data storage apparatus includes: a storage unit managed using a logical block address; a memory; a storage control unit for storing in the storage unit a free area control table transmitted from the host apparatus in which information on a free area in the storage unit is stored; an expanding unit for reading the free area control table in the storage unit and expanding it in the memory; a recording unit for recording data transmitted from the host apparatus into a free area in the storage unit on the basis of the free area control table in the memory; an updating unit for updating the free area control table in the memory after the data recording unit has completed a recording operation; and a transmission unit for transmitting to the host apparatus updated information included in the free area control table which has been updated by the updating unit.

3 Claims, 6 Drawing Sheets

| CLUSTER NUMBER | STATE OF CLUSTER (FREE = 1, ACTIVE = 0) |
|---|---|
| ⋮ | 1 |
| 12340h | 0 |
| ⋮ | ⋮ |
| 12347h | 0 |
| 12348h | 1 |
| ⋮ | ⋮ |

| bit | 7 | 6 | 5 | 4 | 3 | 2 | 1 | 0 |
|---|---|---|---|---|---|---|---|---|
| Command | TBD | | | | | | | |
| Features | STR | END | Rsv | | | | | |
| Sector Count | Sector Count | | | | | | | |
| LBA Low | Rsv | | | | | | | |
| LBA Middle | Rsv | | | | | | | |
| LBA High | Rsv | | | | | | | |
| Device/Head | obs | LBA | obs | DEV | Rsv | | | |

FIG. 5A

| bit | 7 | 6 | 5 | 4 | 3 | 2 | 1 | 0 |
|---|---|---|---|---|---|---|---|---|
| Error | na | na | Na | IDNF | na | ABRT | na | na |
| Sector Count | LBA(7:0) | | | | | | | |
| LBA Low | LBA(15:8) | | | | | | | |
| LBA Middle | LBA(23:16) | | | | | | | |
| LBA High | Na | | | | LBA(27:0) | | | |
| Device | obs | na | Obs | DEV | na | na | na | na |
| Status | BSY | DRDY | DF | na | DRQ | na | na | ERR |

DATA STORAGE APPARATUS AND DATA ACCESS METHOD FOR CONTROLLING ADDRESS INFORMATION FOR DATA WRITING USING A FREE AREA CONTROL TABLE

CROSS REFERENCES TO RELATED APPLICATIONS

The present application claims priority to Japanese Patent Application JP 2006-077278 filed in the Japanese Patent Office on Mar. 20, 2006, the entire contents of which is incorporated herein by reference.

BACKGROUND

The present disclosure relates to a data storage apparatus using both of or either of a nonvolatile solid-state memory and a rotating recording medium, more specifically, to a data storage apparatus capable of controlling address information required for data writing using a free area control table and being accessed by means of a file system that performs block access and a data access method therefor.

Currently, various recording media such as flash memories each containing a nonvolatile solid-state memory are used to store data. Such a recording medium is connected to a host apparatus such as a PC (Personal Computer) (see, for example, Japanese Unexamined Patent Application Publication No. 2006-48227).

When data writing or data reading is performed, some recording media use address administration information, that is, data location information so as to determine a position therein at which or from which data will be written or read.

Such a recording medium can reduce the load on a CPU included in a host apparatus and has a big advantage of processing a plurality of streams. On the other hand, however, if such a recording medium is actually used, an existing file system for the recording medium is required to be considerably modified. The file system modification will create burdens.

Furthermore, recording media developers have to separately develop firmware, which will be stored in a recording medium, for each type of file system, because a method of managing data location information varies according to a type of file system used. Coding and validation required for the development are burdens on them. In addition, a development period is protracted.

In the case of consumer appliances, specific functions corresponding to characteristics of a product (for example, a disk scheduling function for a video camera) are strongly required.

It is desirable to provide a data storage apparatus and data access method achieving functions required for consumer appliances while making as few changes to a host apparatus as possible.

SUMMARY

A data storage apparatus according to an embodiment is connected to a host apparatus, and data stored in the data storage apparatus is accessed under the control of the host apparatus. The data storage apparatus includes: a storage unit managed using a logical block address; a memory; a storage control unit for storing a free area control table transmitted from the host apparatus in the storage unit, the free area control table storing information on a free area in the storage unit; an expanding unit for reading out the free area control table stored in the storage unit and expanding the read free area control table in the memory; a data recording unit for recording data transmitted from the host apparatus into a free area in the storage unit on the basis of the free area control table expanded in the memory in response to a predetermined command transmitted from the host apparatus; a table updating unit for updating the free area control table expanded in the memory after the data recording unit has completed a recording operation; and a transmission unit for transmitting to the host apparatus updated information included in the free area control table which has been updated by the updating unit.

A data access method according to an embodiment is for a data storage apparatus. The data storage apparatus is connected to a host apparatus, and data stored in the data storage apparatus is accessed under the control of the host apparatus. The data access method includes the steps of: storing a free area control table transmitted from the host apparatus in a storage unit managed using a logical block address, the free area control table storing information on a free area in the storage unit; reading out the free area control table stored in the storage unit and expanding the read free area control table in a memory; recording data transmitted from the host apparatus into a free area in the storage unit on the basis of the free area control table expanded in the memory in response to a predetermined command transmitted from the host apparatus; updating the free area control table expanded in the memory after a recording operation has been completed; and transmitting updated information included in the free area control table to the host apparatus.

According to an embodiment, changes to a host apparatus required when a data storage apparatus according to an embodiment of the present invention is connected to the host apparatus can be minimized. In addition, functions requested by the host apparatus can be achieved.

Additional features and advantages are described herein, and will be apparent from, the following Detailed Description and the figures.

DETAILED DESCRIPTION

The present disclosure includes embodiments of to a data storage apparatus that is connected to a host apparatus, stores data transmitted from the host apparatus, reads the stored data, and transmits the read data to the host apparatus. The configuration and operation of a data storage apparatus capable of achieving functions required for consumer appliances while making as few changes to a host apparatus as possible are described below.

In the following, a hybrid storage apparatus that is a combination of a hard disk (HD) and a nonvolatile solid-state memory will be described as a data storage apparatus. However, a data storage apparatus may include either of a hard disk and a nonvolatile solid-state memory. A nonvolatile solid-state memory is used for a memory card, and is, for example, a NAND flash memory that transmits or receives data on a block-by-block basis.

A case in which an MS-DOS compatible FAT file system is used is described below. However, any file system capable of managing data in the form of files may be used instead of the MS-DOS compatible FAT file system.

Configuration of Data Storage Apparatus

Figure 1:
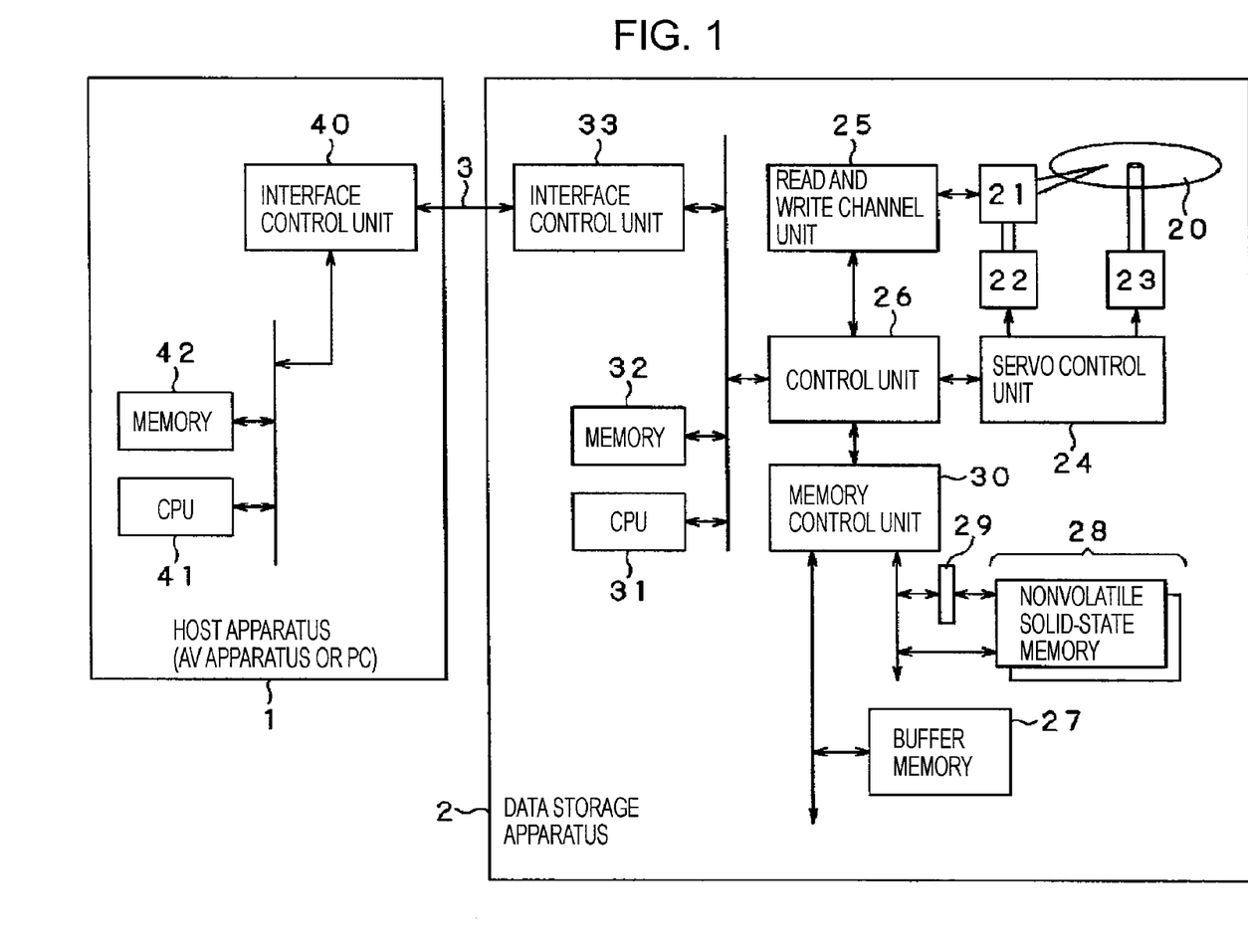
FIG. 1 is a block diagram showing a configuration of a data storage apparatus according to an embodiment.

FIG. 1 is a diagram showing a state in which a host apparatus 1 such as a PC or an AV apparatus and a data storage apparatus 2 are connected via an interface cable 3 such as an IDE (Integrated Drive Electronics) cable, an SCSI (Small Computer System Interface) cable, an FC (Fibre Channel) cable, or a USB (Universal Serial Bus) cable.

As shown in FIG. 1, the data storage apparatus 2 is provided with the following components: a head unit 21 for writing or reading data into or from a recording medium 20; a head drive unit 22 for driving the head unit 21 so as to cause the head unit 21 to access the recording medium 20; a recording medium drive unit 23 for driving the recording medium 20 in a predetermined direction at a predetermined rotational speed; a servo control unit 24 for controlling the head drive unit 22 and the recording medium drive unit 23; a read and write channel unit 25 that is connected to the head unit 21 and performs predetermined processing upon received data; a control unit 26 for controlling the servo control unit 24 and the read and write channel unit 25; a buffer memory 27 for temporarily buffering data; a nonvolatile solid-state memory 28 having a predetermined capacity; a page buffer 29 having a predetermined capacity; a memory control unit 30 for controlling the buffer memory 27, the nonvolatile solid-state memory 28, and the page buffer 29 when the nonvolatile solid-state memory 28 is accessed so as to write or read data thereinto or therefrom; a central processing unit (CPU) 31 for performing predetermined computation, setting a command and a parameter to each component included in the data storage apparatus 2, and causing the component to operate; a memory 32 used for computation performed by the CPU 31; and an interface control unit 33 for transmitting or receiving data, control information, etc. to or from the host apparatus 1.

File System

A file system used by the data storage apparatus 2 is described below with reference to FIG. 2. It is assumed that the recording medium 20 is a Hard Disk (HD).

A sector (the size of which is typically 512 bytes) is the smallest unit of data that is recorded on the recording medium 20. The host apparatus 1 accesses the recording medium 20 using a logical block address (LBA). A page is the smallest unit of data that is recorded in the nonvolatile solid-state memory 28. The size of a page does not necessarily match the size of a sector, but corresponds to an integral multiple of the size of a sector. Accordingly, a logical page number and a logical address can be easily associated with each other. The host apparatus 1 can therefore access not only the recording medium 20 but also the nonvolatile solid-state memory 28 in the data storage apparatus 2 using a logical block address (LBA).

In a file system for managing files, a plurality of sectors (the N number of sectors) are defined as one cluster. This cluster is the smallest unit of data used when data reading and data writing are performed. The FAT (File Allocation Table) is a table recording information about how a single file is stored in clusters. A file system using this FAT is called a FAT file system. In the following, a cluster address is acquired by simply dividing the LBA by N (in this embodiment, N=16 and 1 cluster=8 Kbytes).

A FAT file system volume includes three areas (a reserved area A, a FAT area B, and a directory and data area C). The directory and data area C includes a directory entry D. In this embodiment, only a single partition is used. Accordingly, a volume and a partition are the same.

Figure 2:
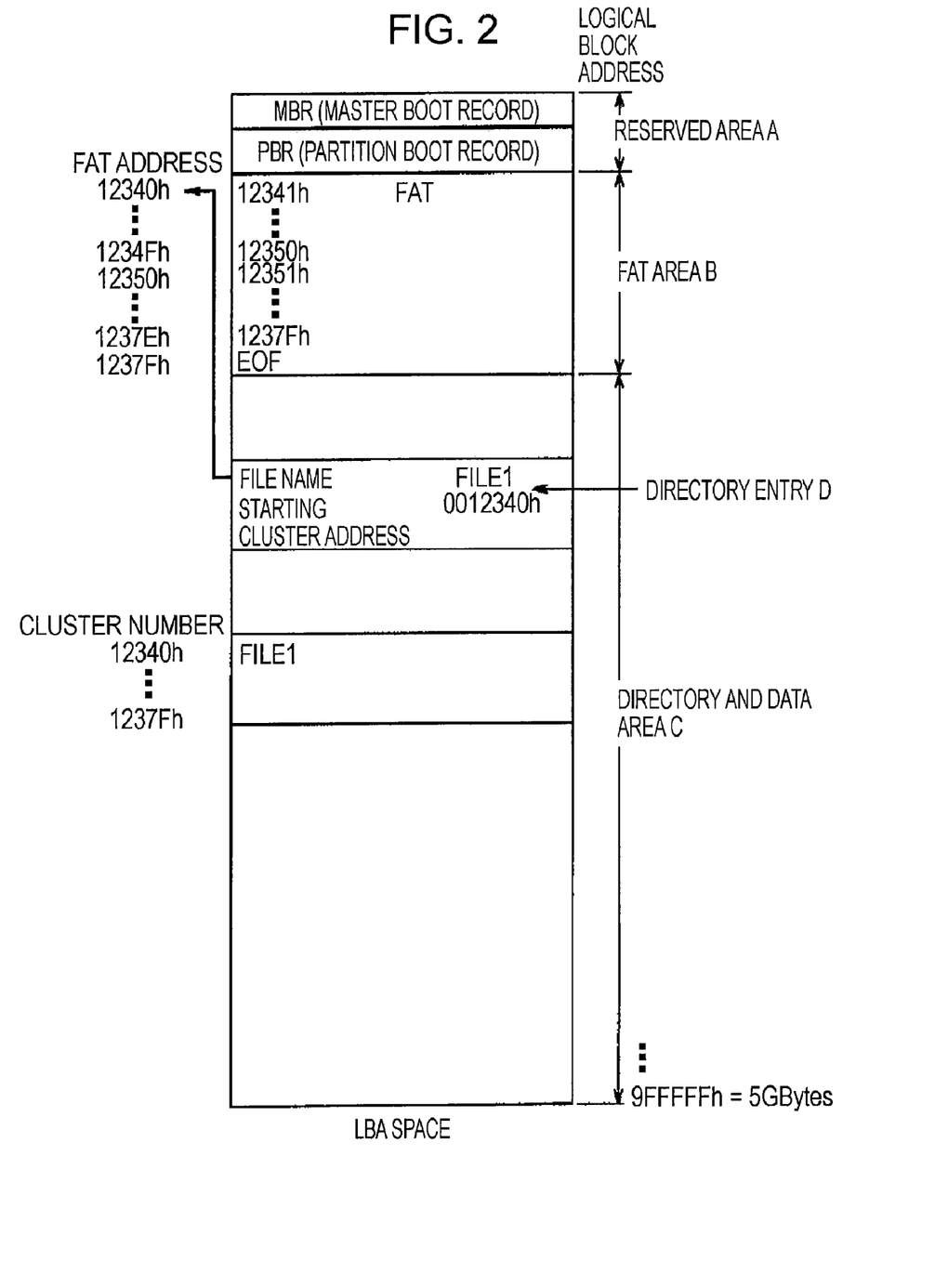
FIG. 2 is a schematic diagram showing LBA space used to describe a file system.

As shown in FIG. 2, the directory entry D contains a file name and a starting cluster number. The host apparatus 1 reads out data of the directory entry D to acquire the starting cluster number ("12340h" in an example shown in FIG. 2), refers to a FAT entry corresponding to the acquired starting cluster number, and then determines that the cluster number of the next cluster is "12341h". The host apparatus 1 continuously acquires subsequent cluster numbers until it acquires the last cluster number "1237Fh" whose FAT entry is "EOF (End of File)". The host apparatus 1 accesses a file on the basis of the acquired location information.

The recording medium 20 is managed on the basis of the above-described FAT (File Allocation Table) file system, and is configured with a disk recording medium such as an HD (Hard Disk) including a user data area in which data is stored in clusters of a predetermined data size in association with addresses (hereinafter, referred to as physical addresses).

If the recording medium 20 is a magnetic recording medium such as an HD, the head unit 21 is configured with a magnetic head that has magnetosensitive elements. The magnetosensitive elements are used to detect a signal magnetic field generated by the recording medium 20 using the so-called magnetoresistance effect in which a resistance is changed in accordance with the strength and direction of an external magnetic field.

The head drive unit 22 controls the head unit 21 under the control of the servo control unit 24.

The recording medium drive unit 23 controls the recording medium 20 under the control of the servo control unit 24 so that the recording medium 20 can rotate at a predetermined rotational speed.

The servo control unit 24 controls the recording medium drive unit 23 so as to cause the recording medium 20 to rotate in a predetermined direction at a predetermined rotational speed, and controls the head drive unit 22 so as to cause the head unit 21 to access a predetermined position on the recording medium 20.

When data writing is performed, the read and write channel unit 25 codes (modulates) received data, converts the coded data into a digital bit stream suitable for characteristics of the storage and reproduction apparatus, and then transmits the converted data to the head unit 21. When data reading is performed, the read and write channel unit 25 removes high-frequency noise from a reproduction signal transmitted from the head unit 21, converts the reproduction signal into a digital signal using an analog digital converter (ADC), performs predetermined processing upon the digital signal using the maximum likelihood decoding method or the like, and then demodulates the processed signal.

The control unit 26 manages data exchanges (transmission and reception) between the buffer memory 27, the nonvolatile solid-state memory 28, the read and write channel unit 25, and the interface control unit 33, and performs data format processing. In addition, the control unit 26 performs coding processing using an error-correcting code, error detection processing, and error correction processing when performing the data format processing.

Data transmitted from the host apparatus 1 is stored in the recording medium 20 or the nonvolatile solid-state memory 28. At that time, or when data reading is performed, the buffer memory 27 temporarily stores the data (performs buffering processing) so as to prevent performance degradation of the data storage apparatus 2 due to a difference in data transmission speed and a startup delay. The buffer memory 27 is usually configured with a DRAM or an SRAM from a cost viewpoint.

The nonvolatile solid-state memory 28 is, for example, a NAND-type flash memory card (memory stick, compact flash, or SD card) using the FAT file system, and has a data area in which data is stored in pages of a predetermined data size in association with predetermined addresses (hereinafter referred to as logical page numbers). When data is written into a certain page included in the nonvolatile solid-state memory 28, data that has been stored in advance in the page is required to be deleted.

The page buffer 29 is disposed between the nonvolatile solid-state memory 28 and the memory control unit 30, and is used to effectively transmit data on a page-by-page basis between the buffer memory 27 and the nonvolatile solid-state memory 28. In addition, the page buffer 29 is used to copy data at a certain position to another position in the nonvolatile solid-state memory 28 without using the buffer memory 27. The data storage apparatus 2 may not contain the page buffer 29. However, it is desirable that the data storage apparatus 2 have the page buffer 29.

When data transmitted from the host apparatus 1 is written into the recording medium 20 or the nonvolatile solid-state memory 28, or when data is read out from the recording medium 20 or the nonvolatile solid-state memory 28 and is then transmitted to the host apparatus 1, the memory control unit 30 performs predetermined memory control processing.

Configuration of Host Apparatus

The host apparatus 1 is provided with an interface control unit 40 for transmitting or receiving data to or from the data storage apparatus 2 via the interface cable 3, a CPU 41 for performing predetermined computation processing, and a memory 42 used for computation performed by the CPU 41. The host apparatus 1 is an application apparatus such as a video camera, a digital camera, or a music player that efficiently performs recording and reproduction processing by using the data storage apparatus 2.

When power is turned on, the CPU 41 uploads each piece of management data stored in a boot area, a FAT area, and a directory area which are system areas of the recording medium 20 to the memory 42 by performing a predetermined processing flow, sets parameters on the basis of the uploaded data, and then transmits various commands to the data storage apparatus 2 on the basis of the set parameters.

Figure 3:
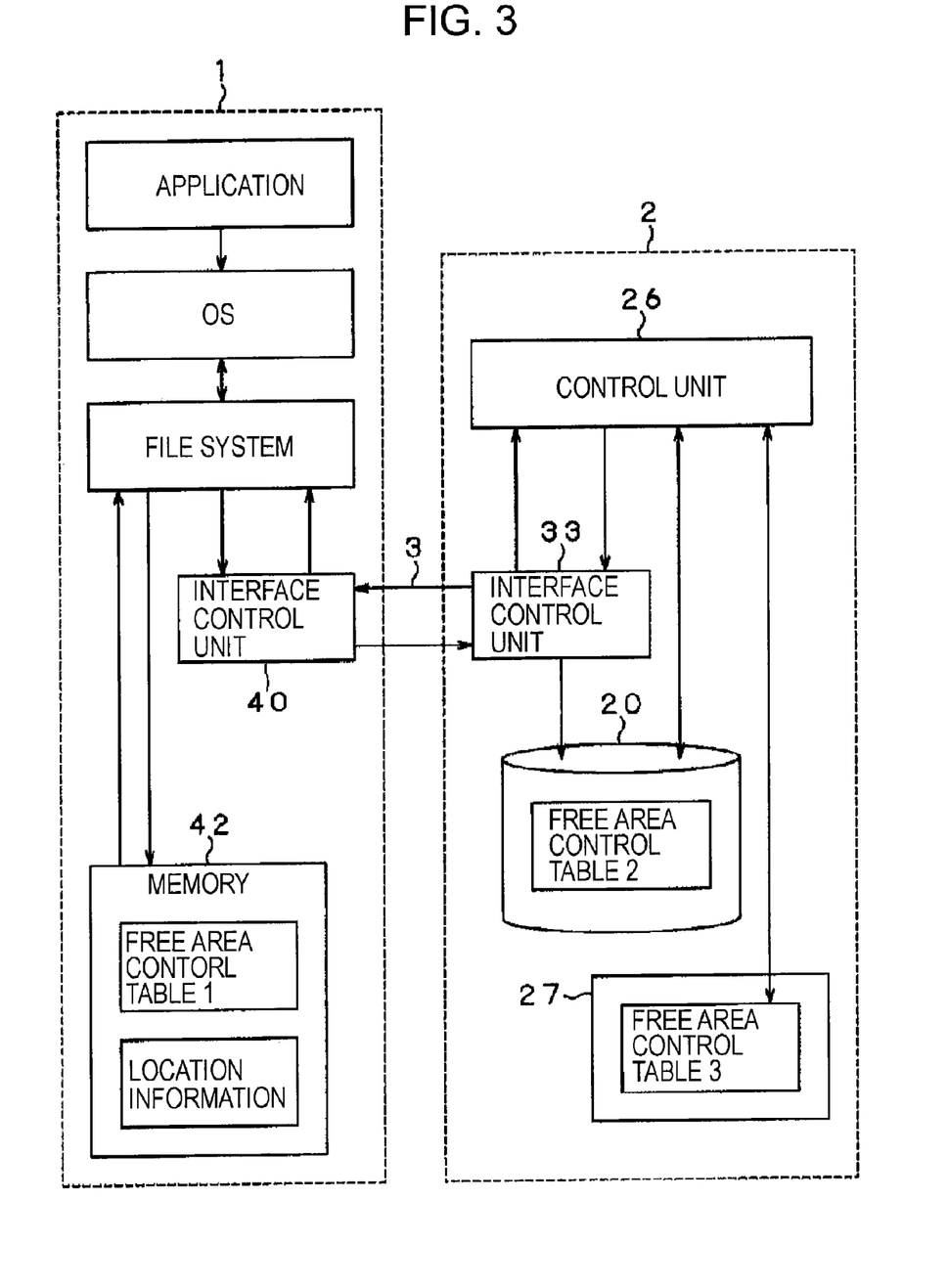
FIG. 3 is a diagram used to describe a case in which a free area control table is stored in a host apparatus and the data storage apparatus.

The data storage apparatus 2 according to an embodiment has the same table as a table (hereinafter referred to as a free area control table) stored in the memory 42 in the host apparatus 1 which is used to manage a free area in the recording medium 20 or the nonvolatile solid-state memory 28 (FIG. 3). The control unit 26 and the interface control unit 33 may be integrated.

Figure 4:
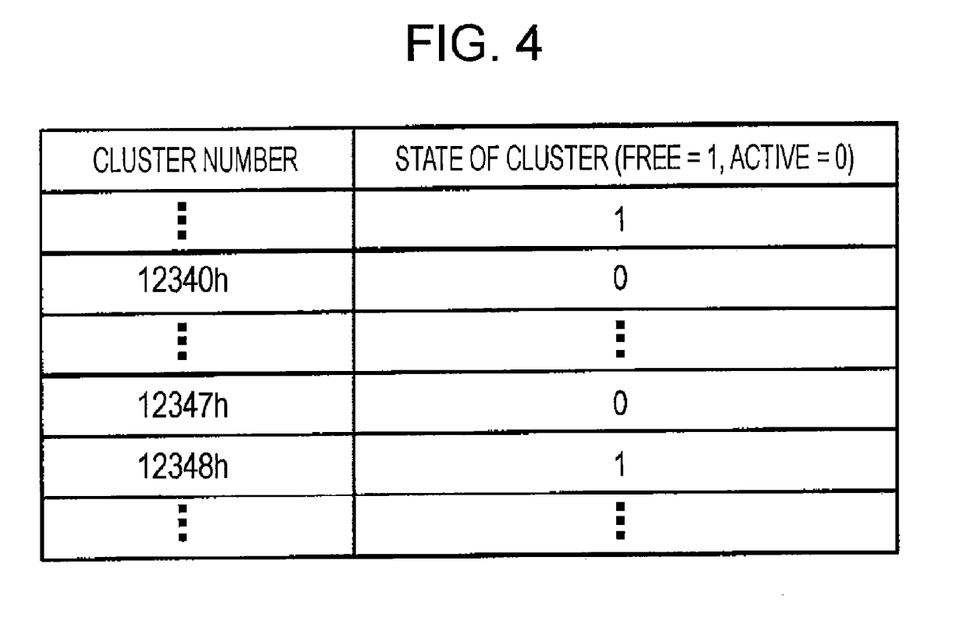
FIG. 4 is a schematic diagram showing an example of a free area control table.

Here, an example of a free area control table is shown in FIG. 4. The free area control table in FIG. 4 shows cluster numbers and the states of clusters. When a cluster is not used, a numeral "1" representing a free area is assigned as a cluster number of the cluster. When a cluster is used, a numeral "0" representing an active area is assigned as a cluster number of the cluster. FIG. 4 shows a case in which only a File 1 exists (clusters of clusters numbers "12340h" to "12347h" are used).

Figure 5A:
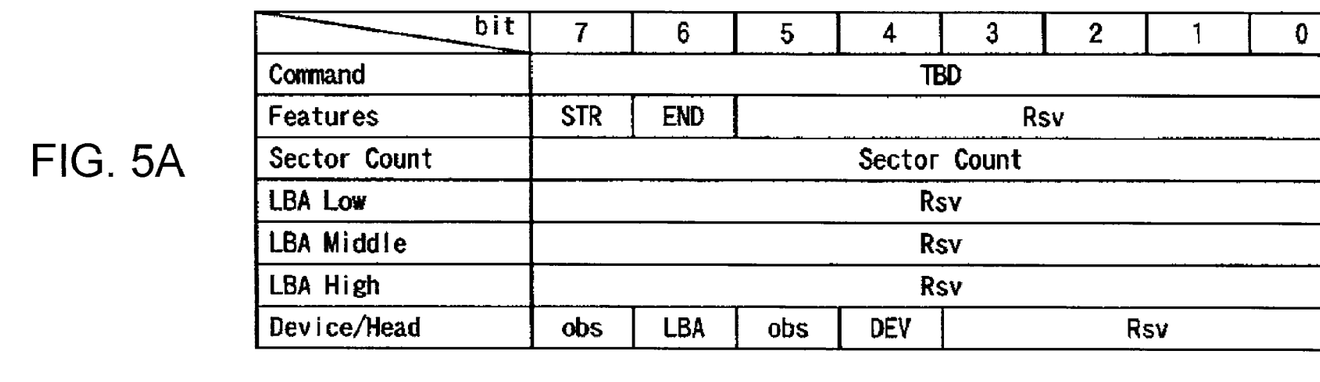
FIG. 5A is a schematic diagram showing the AV Write Sector (s) command that is transmitted from the host apparatus to the data storage apparatus when data writing is performed.

The host apparatus 1 transmits to the data storage apparatus 2 a command (AV Write Sector(s) in FIG. 5A) that causes the data storage apparatus 2 to determine data location on the basis of only the free area control table and perform data writing. A command (AV Write Sector(s)) shown in FIG. 5A is represented using the standard ATA command register.

When the command is executed for the first time, the host apparatus 1 writes a numeral "1" into the "STR" included in the command, and transmits the command to the data storage apparatus 2. When the command is executed for the last time, the host apparatus 1 writes a numeral "1" into the "END" included in the command, and transmits the command to the data storage apparatus 2.

Other contents included in the command ("LBA", "DEV", "Sector Count", etc.) are used like the standard ATA command Write Sector(s).

When the execution of the command (AV Write Sector(s)) has been completed, the data storage apparatus 2 outputs the execution result to the Task File Register (FIG. 5B) so as to inform the host apparatus 1 of the completion of the command. The host apparatus 1 reads out the execution result.

Figure 5B:
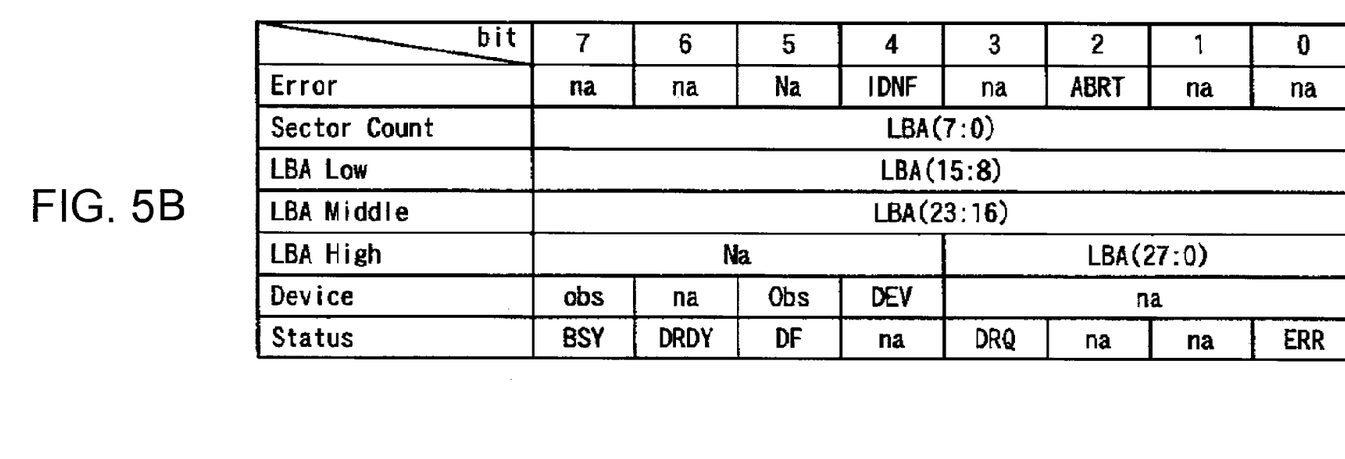
FIG. 5B is a schematic diagram showing the Task File Register command that is transmitted from the data storage apparatus to the host apparatus when the execution of the AV Write Sector (s) command has been completed.

LBA information which the data storage apparatus 2 has used to perform data writing is written in each of the "LBAs" included in the Task File Register. Other contents included in the command ("DEV", "BSY", "DRDY", "DF", "DRQ", "ERR", etc.) are used like the standard ATA command Write Sector(s).

Figure 6:
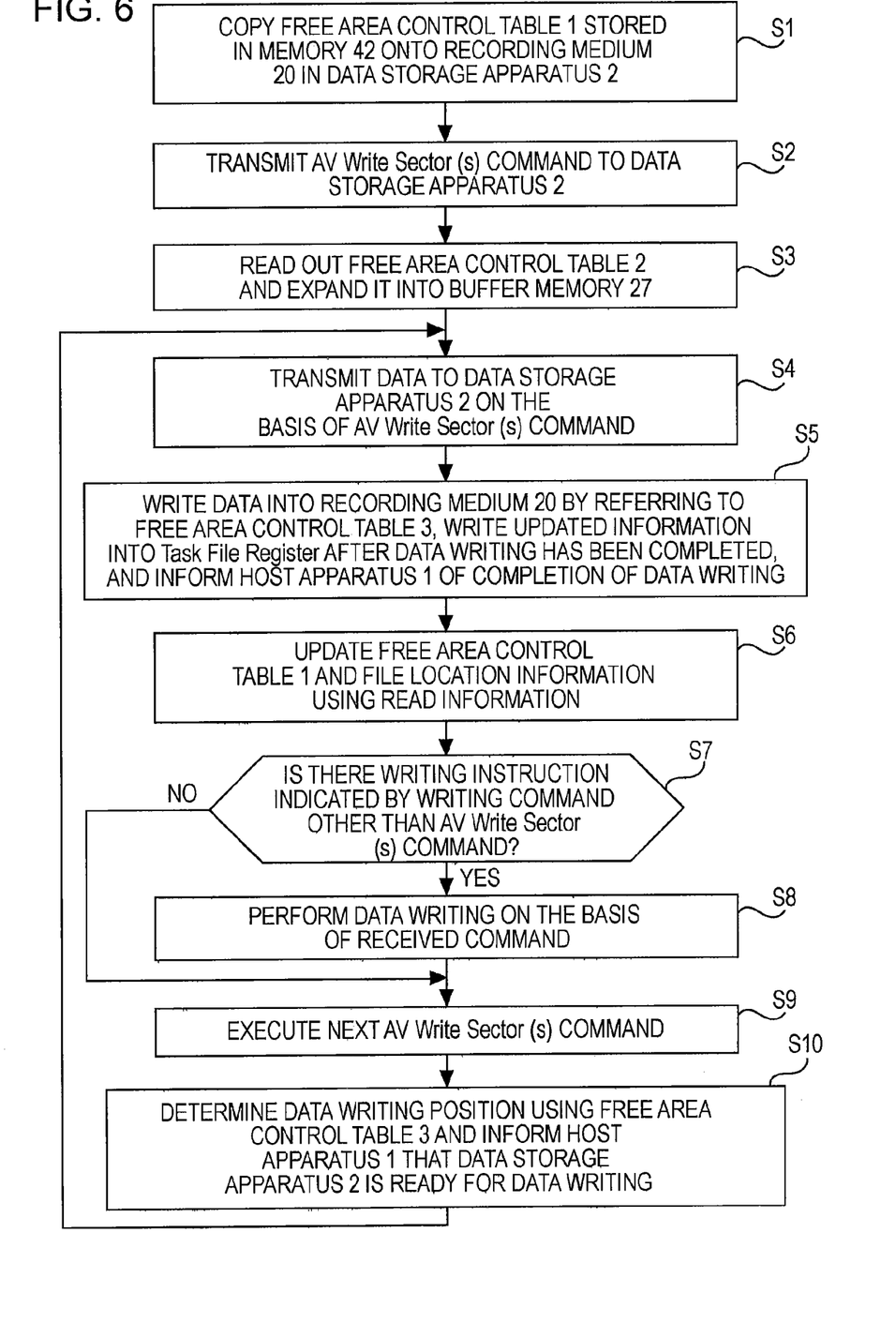
FIG. 6 is a flowchart used to describe a processing flow of writing a file using the AV Write Sector (s) command.

Here, a processing flow in which information included in a free area control table 1 stored in the memory 42 in the host apparatus 1 is transmitted to the data storage apparatus 2, and then data is transmitted from the host apparatus 1 to the data storage apparatus 2 will be described. In the following, it is assumed that the data storage apparatus 2 has only the recording medium 20. A free area control table stored in the memory 42 in the host apparatus 1 is defined as the free area control table 1. A free area control table stored in the recording medium 20 is defined as a free area control table 2. A free area control table stored in the buffer memory 27 is defined as a free area control table 3.

In step S1, the host apparatus 1 copies the free area control table 1 stored in the memory 42 onto the recording medium 20 included in the data storage apparatus 2, whereby the free area control table 2 is stored on the recording medium 20.

In step S2, the host apparatus 1 transmits the AV Write Sector (s) command to the data storage apparatus 2. At that time, in the AV Write Sector(s) command, a numeral "1" is written into the "STR" bit. The host apparatus 1 cannot designate a data writing position (even if the host apparatus 1 designates a data writing position, the designation of the data writing position is ignored by the data storage apparatus 2).

In step S3, the data storage apparatus 2 reads out the free area control table 2 from the recording medium 20, and expands it into the buffer memory 27, whereby the free area control table 3 is expanded into the buffer memory 27. The data storage apparatus 2 refers to the free area control table 3 expanded in the buffer memory 27 so as to determine a data writing position. When the data storage apparatus 2 is ready for data writing, the data storage apparatus 2 informs the host apparatus 1 of this state.

In step S4, the host apparatus 1 transmits data of a volume designated by the "Sector Count" included in the AV Write Sector (s) command to the data storage apparatus 2.

In step S5, the data storage apparatus 2 writes the data transmitted from the host apparatus 1 into the recording medium 20 on the basis of the free area control table 3 expanded in the buffer memory 27, writes information updated this time (updated LBA) into the Task File Register after completing the data writing, and informs the host apparatus 1 of the completion of the data writing. On the other hand, the host apparatus 1 reads out the result of the data writing from the Task File Register. In addition, the data storage apparatus 2 updates the free area control table 3 expanded in the buffer memory 27. If the command is the last AV Write Sector (s) command, the data storage apparatus 2 initializes the free area control table 3.

In step S6, the host apparatus 1 updates the free area control table 1 and the file location information using the read-out information. If the command is the last AV Write Sector (s) command, the process ends.

In step S7, the data storage apparatus 2 checks whether there is a writing instruction indicated by a writing command (for example, Write Sector (s) command) other than the AV Write Sector (s) command. If there is another writing instruction, the process proceeds to step S8. If there is no writing instruction, the process proceeds to step S9.

In step S8, the data storage apparatus 2 writes data into the "LBA" included in the received Write Sector (s) command. The data storage apparatus 2 informs the host apparatus 1 of the completion of the data writing after completing the data writing. In addition, the data storage apparatus 2 updates the free area control table 3.

In step S9, the host apparatus 1 executes the next AV Write Sector (s) command. If the command is the last AV Write Sector(s) command, the host apparatus 1 writes a numeral "1" into the "END" included in the command.

In step S10, the data storage apparatus 2 determines a data writing position on the basis of the free area control table 3 expanded in the buffer memory 27, and informs the host apparatus 1 that it is ready for data writing. Subsequently, the process returns to step S4.

In the above description, it is assumed that the host apparatus 1 has a free area control table. For example, in the UDF (Universal Disk Format) file system, the "Space Bit Map Descriptor" is standardized. In the "Space Bit Map Descriptor", information about whether each logical block is used is included. However, in the case of the above-described FAT file system, the equivalent thereof is not standardized. Accordingly, if the FAT file system is used, a free area control table is required to be created using location information (FIG. 3). In addition, the host apparatus 1 is required to update the location information stored in the recording medium 20 with the latest information in step S1. Accordingly, the control unit 26 reads out the location information from the recording medium 20 and creates a free area control table in the buffer memory 27 on the basis of the read location information.

In this embodiment, even if a standardized free area control table exists, the format of the provisional free area control table and the format of the free area control table 3 expanded in the buffer memory 27 may not necessarily be the same. If a plurality of file systems are supported, the formats of these file systems may be different from each other due to differences in management block unit and free area retrieval method. In this embodiment, in order to prevent the effects of the differences, the format of the free area control table 2 stored in the recording medium 20 is converted so as to fix the format of the free area control table 3 expanded in the buffer memory 27.

The control unit 26 has a function of checking whether the free area control table 1 stored in the memory 42 in the host apparatus 1 is the same as the free area control table 3 expanded in the buffer memory 27. If the free area control table 1 and the free area control table 3 are not the same, the control unit 26 transmits updated information included in the free area control table 3 expanded in the buffer memory 27 to the host apparatus 1. The host apparatus 1 updates the free area control table 1 with the transmitted updated information.

In FIG. 6, the case in which a single file is transmitted from the host apparatus 1 to the data storage apparatus 2 and is then written into the recording medium 20 using the AV Write Sector (s) command has been described. However, a plurality of files can be written into the data storage apparatus 2 according to an embodiment.

In this embodiment, the processing flow of data writing has been described. However, the data storage apparatus 2 according to an embodiment can also read data from the recording medium 20. Here, there are two data reading methods, a usual reading method (method 1) and a special reading method (method 2). The method 1 is a method of causing the host apparatus 1 to retrieve a storage position of a desired file on the basis of the location information stored in the memory 42, create the standard ATA command Read Sectors on the basis of the result of the retrieval, and read out the desired file from the data storage apparatus 2 using the created standard ATA command Read Sectors. The method 2 is a method (Look Ahead Reading method) of causing the data storage apparatus 2 to receive a file reading command from the host apparatus 1, read out the location information stored in the recording medium 20 on the basis of the received file reading command, analyze the read location information, read out a file specified by the host apparatus 1 from the recording medium 20 on the basis of the result of the analysis, and transmit the read file to the host apparatus 1 or store the read file in the buffer memory 27, read out the file from the buffer memory 27 in response to a request transmitted from the host apparatus 1, and transmit the read file to the host apparatus 1.

According to the data storage apparatus 2, the host apparatus 1 can manage file metadata and link information included in the directory entry. If the data storage apparatus 2 according to an embodiment is used, an address used for data writing and data reading is required to be changed from an address that is determined on the basis of a file system used by the host apparatus 1 to an address determined by the data storage apparatus 2. This is the only change required when the data storage apparatus 2 is used. It is not required to make changes to firmware that manages the file metadata and the link information.

According to an embodiment, a free area control table is defined irrespective of a table and location information which are specific to a file system used by the recording medium 20. Accordingly, firmware for the control unit 26 included in the data storage apparatus 2 can be developed with a high degree of efficiency.

In this embodiment, an HDD is used as a data storage apparatus. However, if a random-access storage apparatus such as an optical disc (CD or DVD) is used, the same processing can be performed. In the above description, a FAT file system is used. However, any file system capable of managing data in the form of files can be used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A data storage apparatus connected to a host apparatus, data stored in the data storage apparatus being accessed under the control of the host apparatus, the data storage apparatus comprising:
    a storage unit managed using a logical block address;
    a memory;
    a storage control unit configured to store a free area control table transmitted from the host apparatus in the storage unit, the free area control table storing information on a free area in the storage unit;
    an expanding unit configured to:
        (a) read out the free area control table stored in the storage unit; and
        (b) expand the free area control table in the memory;
    a data recording unit configured to record data transmitted from the host apparatus into a free area in the storage unit based on the free area control table expanded in the memory in response to a predetermined command transmitted from the host apparatus;
    a table updating unit configured to update the free area control table expanded in the memory after the data recording unit has completed a recording operation;
    a transmission unit configured to transmit to the host apparatus updated information included in the free area control table which has been updated by the updating unit; and
    a determination unit configured to determine whether a free area control table stored by the host apparatus is the same as said free area control table expanded in the memory, wherein when the determination unit determines that the free area control table stored by the host apparatus is not the same as the free area control table expanded in the memory, the transmission unit transmits to the host apparatus information included in the free area control table expanded in the memory.

2. The data storage apparatus of claim 1, wherein the storage unit has a location table including file location information.

3. A data access method for a data storage apparatus connected to a host apparatus, data stored in the data storage apparatus being accessed under the control of the host apparatus, the data access method comprising:
    storing a free area control table transmitted from the host apparatus in a storage unit managed using a logical block address, the free area control table storing information on a free area in the storage unit;
    reading out the free area control table stored in the storage unit;
    expanding the read free area control table in a memory;
    recording data transmitted from the host apparatus into a free area in the storage unit based on the free area control table expanded in the memory in response to a predetermined command transmitted from the host apparatus;
    updating the free area control table expanded in the memory after a recording operation has been completed;
    transmitting updated information included in the free area control table to the host apparatus; and
    determining whether a free area control table stored by the host apparatus is the same as said free area control table expanded in the memory, wherein when the determination is that the free area control table stored by the host apparatus is not the same as the free area control table expanded in the memory, information included in the free area control table expanded in the memory is transmitted to the host apparatus.

* * * * *